Patented Dec. 27, 1938

2,142,077

UNITED STATES PATENT OFFICE 2,142,077

ALKALI-RESISTING PHENOLIC ALDEHYDE SICCATIVE COMPOSITION AND PROCESS OF MAKING SAME

John B. Rust, Orange, N. J., assignor to Ellis-Foster Company, a corporation of New Jersey No Drawing. Application December 23, 1935, Serial No. 55,842

8 Claims. (Cl. 260—19)

This invention relates to phenolic resin siccative compositions and a process of making same, having as an object the production of varnish and lacquer solutions capable of forming air-hardening films which are relatively alkali resisting.

In varnish making practice an oil-soluble phenolic resin customarily is mixed with a drying oil, for example, tung oil, and the mixture is heated to a high temperature, usually from 230–280° C. or higher, and maintained at this temperature until the varnish mixture has thickened to the desired viscosity, then is thinned with a suitable solvent. The object of heating the resin and oil to a high temperature is to render the varnish mixture soluble in mineral spirit solvent and the varnish film free from frosting, crow-footing or wrinkling. For instance, if tung oil and an oil-soluble phenolic resin are heated to, say, 150° C. until the resin dissolves then thinned with V. M. & P. naphtha, the varnish mixture would not be entirely soluble yielding a cloudy solution. However if this same varnish mixture is dissolved in xylol the solution is clear but the film from the solution upon drying would wrinkle and become covered with a network of fine lines. Thus, in the ordinary varnish kettle practice of making such varnishes, paints or enamels, the purpose of heat-treatment of the oil-resin mixture at a high temperature is merely to thicken the composition to the correct viscosity, to increase its solubility in mineral spirit solvents, to prevent the varnish film from crow-footing, frosting or wrinkling and to increase its resistance to film destroying agents. If tung oil and oil-soluble phenolic resin are heated at a low temperature, say, 100–150° C., little or no thickening takes place in several hours and the varnish is not entirely soluble in mineral spirits and a film would crow-foot and wrinkle upon drying. When heated at a high temperature the varnish compositions probably thicken mainly through a polymerization of the drying oil. Thickening may also be due to a slight extent to the reaction of a resin molecule with a molecule of drying oil.

The present invention, however, represents a radical departure from the old varnish kettle practice. The process comprises reacting an oil-soluble phenolic resin with a drying oil in the presence of a catalyst at a low temperature. When I speak of low temperatures I mean temperatures from about 90° to 160° C. Any acid catalyst may be used but I prefer to use catalysts which are soluble in both the drying oil, resin and oil-resin mixture; are easily removable from the oil-resin reaction product either by washing or volatilization; will not darken the resin-oil reaction product; will not polymerize, gelatinize or char the drying oil. In general oxalic acid fits these requirements, although I may use other acids such as dichloracetic acid, phosphoric acid, hydrochloric acid, p-toluene sulphonic acid, sulphuric acid or monochloracetic acid. The proportion of the catalyst depends upon its strength, although in general from 2% to .5% in the case of oxalic acid will suffice. Hydrochloric acid, being a much stronger acid and therefore inclined to gelatinize and cause darkening, preferably should not be present in quantities over .5%. The proportion of drying oil to oil-soluble phenolic resin in this invention is not limited but may vary from, say, 1 part of drying oil to 2 parts of resin to 1 part of drying oil to ¼ of a part of resin.

Although I may use any drying oil, I prefer tung oil or oiticica oil or some fatty oil containing conjugated double bonds, since this type is the most reactive. The advantages of the present process are the production of thickened varnish mixtures at a low temperature which are fast to light, dry rapidly, are substantially alkali, acid, water and weathering resisting.

As I have stated, in the usual varnish kettle method of making varnishes the thickening of the oil-resin mixture probably is due mainly to a polymerization of the drying oil itself. However in the present process thickening of the oil-resin mixture seemingly is due to a reaction of a resin molecule with a drying oil molecule. This is indicated by the fact that when the resin and oil mixture is heated at, say, 120° C. without a catalyst no thickening is apparent in several hours. If, however, a catalyst is included thickening results upon 5 to 15 minutes of heating. Furthermore if the drying oil and catalyst are heated together at 120° C. without the resin no thickening occurs. Hence, the products of the present invention are new and distinct from those obtained by the usual varnish kettle process, as will further be illustrated hereinafter.

Any oil-soluble phenolic resin may be used as the resinous constituent of the process of this invention. For instance, I may employ an oil-soluble xylenol-formaldehyde resin, resorcinol-ketone resins, naphthol-formaldehyde resins, p-tertiary butyl phenol formaldehyde resins, cresol-acetaldehyde resins or p-hydroxy diphenyl formaldehyde resins. Furthermore mixtures of drying oils such as tung oil and oiticica oil, tung oil and linseed oil, tung oil and soy bean oil, or oiticica oil and perilla oil may be used instead of tung or oiticica oil alone. It is preferable to use either tung or oiticica oil as one of the drying oil components since these latter oils are much more reactive in the process of the present invention with phenolic resins than the linseed or perilla oil type of drying oil.

The incorporation of the drying oil with the oil-soluble phenolic resin in the presence of an acid catalyst is preferably carried out at these relatively low temperatures since the reaction can thus be far better controlled. If the reaction is allowed to proceed too far mineral spirit-insoluble, infusible and gelled masses will result. However, these gelled masses are useful for the production of linoleum-like materials when mixed with cork or other fillers and for various other purposes.

The products of the present invention are more resistant than the varnish compositions made by the usual high-temperature varnish kettle method. This is probably due to the substantially complete reaction which takes place between the resin and drying oil in the present process. For instance, if an oil-soluble xylenol-formaldehyde resin is made into a 25 gallon varnish according to the usual method and a film is poured onto a glass plate and allowed to harden for several days then immersed in a 5% caustic soda solution the film is completely eaten away in about 18 hours. However, if the same xylenol-formaldehyde resin is heated with tung oil in the presence of 2% oxalic acid catalyst in proportions necessary to form a 25 gallon varnish and a film of the varnish poured onto a glass plate, dried several days, then immersed in 5% caustic, the film does not whiten or blister in 36 hours and is only affected after 96 hours of immersion. This represents about a 500% increase in alkali resistance. Although this is a specific example, other resin varnishes made by the present process also show very marked increase in chemical resistance.

The following are examples given better to illustrate the process and products of this invention; all proportions being in parts by weight.

Resin A.—700 parts of a commercial mixture of meta and para cresols are heated to 100°–110° C. with 70 parts of oxalic acid and acetaldehyde gas is passed through the melt for 8 hours at a volume equivalent to 34 parts of acetaldehyde per hour. The dark resin which results is washed with 3000 parts of boiling water then heated to 210°–220° C. to dehydrate, harden and bleach. The final resin is hard, brittle, has a softening point of 103° C. and an acid number of 67. It is very pale yellow in color, being substantially lighter than WW rosin.

Resin B.—One mole of resorcinol is dissolved in two moles of methylethyl ketone and 5% of a 35% aqueous hydrochloric acid solution, based on the total weight of the mixture, is added. The solution is heated under a reflux condenser for 7 hours in which time a resinous product is formed which is hard and brittle at ordinary temperatures. This is washed with water, then heated to 200° C. to dehydrate and harden further. The final resin is hard, brittle and pale yellow in color.

Resin C.—Two parts of mixed xylenols boiling between 210° C. and 225° C. are mixed with one part of a 37% aqueous formaldehyde solution, and 1 to 2% of a 35% aqueous hydrochloric acid solution, based on the total weight of the mixture, is added. The mixture is refluxed up to the point where a well defined water layer appears and heating is continued beyond this point until the resinous layer has thickened. The water layer is decanted and the soft resin heated to 230°–240° C. until a sample drop when cooled on a cold plate is hard and brittle. The final resin has a slight phenolic odor, and is hard, brittle and light in color.

Example 1.—The following series illustrates the results obtained with resin A, making the varnish in the (a) usual manner, and (b and c) by the processes of the present invention.

(a) 20 parts of resin A are mixed with 40 parts of raw tung oil and 4 parts of linseed oil (bodied by heating at 300° C. for 2½ hours, hereafter referred to in examples simply as bodied linseed oil). The mixture is heated at 270° C. for 10 minutes, then at 250° C. for 10 minutes, whereupon the varnish base is well bodied but not overcooked. It is then dissolved in 65 parts of V. M. & P. naphtha and 225 parts of a 33⅓% solution of lead-cobalt naphthenate in V. M. & P. naphtha (hereafter referred to in examples simply as drier solution) are added.

(b) 20 parts of resin A are mixed with 40 parts of raw tung oil, 4 parts of bodied linseed oil and 1 part of oxalic acid. The mixture is heated at 120° C. for 1 hour, then the temperature is raised to 260° C. to volatilize the oxalic acid. As soon as the temperature reaches 260° C. the product is cooled, thinned with 65 parts of V. M. & P. naphtha and 2.25 parts of drier solution added.

(c) The process of example (b) is duplicated in every phase except that the batch is heated at 120° C. for 3 hours instead of 1 hour.

The solutions of varnish (a) and siccative compositions (b) and (c) have about the same viscosity. When poured onto a glass plate and drained off to form a thin film, the film of varnish (a) dries in 6½ hours; that of varnish (b) in 4½ hours; that of varnish (c) in 5¼ hours. The drying time is recorded as the time required for a film to set sufficiently hard so that a strip of copper foil ¼ inch wide just fails to adhere when pressed firmly against the film.

After the films have air-dried for 7 days they are immersed in a 5% aqueous caustic soda solution. The film of varnish (a) whitens in 15 hours and is entirely eaten away in 44 hours; that of varnish (b) does not whiten until 30 hours have elapsed although it is destroyed in 44 hours; that of varnish (c) requires the surprising period of 60 hours to whiten and is not eaten away until 108 hours have elapsed.

Example 2.—The following series illustrates the results obtained when the processes of the present invention are applied to resin B in contrast to a varnish made in the usual manner of varnish kettle practice.

(a) 20 parts of resin B are mixed with 40 parts of raw tung oil and 4 parts of bodied linseed oil. The mixture is heated at 270° C. for 10 minutes, then at 250° C. for 10 minutes, whereupon the oil-resin mixture is sufficiently boiled without being overcooked. It is then cooled, dissolved in 65 parts of V. M. & P. naphtha and 2.25 parts of drier solution added.

(b) 20 parts of resin B are mixed with 40 parts of raw tung oil, 4 parts of bodied linseed oil and 1 part of oxalic acid. The mixture is heated at 120° C. for 1 hour, then the temperature is rapidly carried to 260° C. to remove the oxalic acid by volatilization or decomposition. As soon as the temperature reaches 260° C., the product is cooled, dissolved in 65 parts of V. M. & P. naphtha and 2.25 parts of drier solution added.

(c) The process of example (b) is duplicated in every phase except that the mixture is heated at 120° C. for 3 hours instead of 1 hour.

The varnish solutions of (a), (b) and (c) all have about the same viscosity and color. When they are poured on glass plates and drained to form a thin film, all dry in 3 hours. After drying 7 days, they are immersed in a 5% aqueous caustic soda solution. The film from varnish (a) is entirely destroyed in 11 hours; that from varnish (b) is not destroyed until 23 hours have elapsed; that from varnish (c) is only affected in places after 39 hours.

*Example 3.*—The following series illustrates the process of the present invention applied to resin C in contrast to an ordinary varnish kettle varnish made with the same resin.

(a) 20 parts of resin C are mixed with 40 parts of raw tung oil and 4 parts of bodied linseed oil. The mixture is heated at 270° C. for 10 minutes, cooled, thinned with 65 parts of V. M. & P. naphtha and 2.25 parts of drier solution.

(b) 20 parts of resin C are mixed with 40 parts of raw tung oil, 4 parts of bodied linseed oil and 1 part of oxalic acid. The mixture is heated at 120° C. for 1 hour, then the temperature is raised abruptly to 260° C. to eliminate oxalic acid sufficiently. As soon as the temperature reaches 260° C., the product is cooled, dissolved in 65 parts of V. M. & P. naphtha and 2.25 parts of drier solution added.

(c) The process of example (b) is duplicated, except that the mixture is heated at 120° C. for 3 hours instead of 1 hour.

The varnish solutions (a), (b) and (c) have about the same viscosity and color. When poured on glass plates and drained to form thin films, the film from varnish (a) dries in 5¾ hours; that from varnish (b) in 5 hours; that from varnish (c) in 4½ hours. After drying for 7 days, if they are immersed in a 5% aqueous caustic soda solution the film from varnish (a) whitens in 8 hours and is destroyed in 18 hours; that from varnish (b) whitens after 20 hours immersion and is destroyed only after 40 hours have elapsed; that from varnish (c) requires the exceptionally long time of 50 hours to whiten and is only destroyed after 90 hours.

*Example 4.*—20 parts of resin A are mixed with 40 parts of raw tung oil and 2 parts of oxalic acid. The mixture is heated at 139°–140° C. for 30 minutes, then up to 278° C. over a period of 8 minutes. When the temperature reaches 278° C., the product is immediately cooled by dissolving it in 60 parts of V. M. & P. naphtha. 2.1 parts of drier solution are added and a film poured on a glass plate. The film dries to touch in 4½ hours and when dry, shows no wrinkling, frosting or crow-footing even in the thicker portions. After drying for 44 hours, it is immersed in a 5% aqueous caustic soda solution. The film shows excellent adhesion and only whitens slightly around the edges after 96 hours' immersion.

*Example 5.*—40 parts of resin A are mixed with 70 parts of raw tung oil, 10 parts of bodied linseed oil and 2 parts of oxalic acid. The mixture is heated at 110°–115° C. for 1 hour, then up to 270° C. and held at the latter temperature for 5 minutes, to remove oxalic acid and thicken the product further. It is then cooled, dissolved in 140 parts of V. M. & P. naphtha and 3.6 parts of drier solution added.

The varnish is poured on a glass plate and drained off to form a thin film. The film sets to touch in 2 hours and 50 minutes and fails to adhere to copper foil in 3 hours and 50 minutes. Without drier the varnish sets to touch in 2 hours and 50 minutes and dries hard overnight. Upon drying a film does not frost, crow-foot, or wrinkle. If 1.8 parts of drier solution are added to the varnish instead of 3.6 parts as given above, a film just fails to adhere to a strip of copper foil in 4 hours and 45 minutes and is hard so that considerable pressure of the thumb will not leave a print when dried in 21 hours.

*Example 6.*—50 parts of raw tung oil are mixed with 25 parts of resin A and heated to 120°–130° C. While being mechanically stirred 0.1 part of a 35% aqueous hydrochloric acid solution is added and heating continued for 45 minutes. The temperature is then raised to 260° C. to remove the acid. The thickened reaction mixture is thinned with 75 parts of V. M. & P. naphtha and 2.63 parts of drier solution added. The varnish is rather dark in color, but dries to touch to a comparatively light-colored, wrinkle-free film in about 4 hours.

*Example 7.*—50 parts of raw tung oil are mixed with 25 parts of resin A and 1.5 parts of dichloracetic acid, and heated for 30 minutes at 130° C. The temperature is then raised to 260° C. to eliminate the dichloracetic acid, the thickened reaction product thinned with 75 parts of V. M. & P. naphtha and 2.63 parts of drier solution added. The varnish is somewhat dark in color, but not as dark as that described in the foregoing example.

*Example 8.*—60 parts of raw tung oil are mixed with 20 parts of resin C. The mixture is heated to 200° C. until the resin dissolves, then cooled to 130° C. and 4 parts of sodium bisulphate added. Heating is continued at 130° C. for about 3 hours until the mixture substantially thickens. It is then thinned with 80 parts of V. M. & P. naphtha and the sediment of sodium bisulphate filtered off. Driers are added and a film poured which dries to a non-wrinkled surface.

Thus acid salts may also be used in the present invention in place of acid condensing agents. However, it is best to use those salts which are readily soluble in the drying oil-resin mixture. I may also use neutral salts, as for example, ammonium oxalate, or compounds which generate acids upon heating.

In general it is desirable to remove all traces of the acid condensing agent from the reaction product in order to secure rapid drying. This may be accomplished by heating the reaction product after reaction rapidly to a comparatively high temperature, then cooling quickly and thinning, or only a partial reaction may be secured at a low temperature followed by a prolonged heating at a higher temperature. If oxalic acid is employed as the catalyst, a primary reaction may be effected at 110°–120° C. until a definite thickening has occurred, then the temperature may be raised to 200°–220° C. and held at this latter value until substantially all of the oxalic acid has been sublimed. The oxalic acid, or other acid condensing agent, may be neutralized in the reaction product by esterifying it with an alcohol, or the acid may be washed out by boiling the siccative base in water until the wash water is neutral to litmus and the entrained water removed under a vacuum, or the product heated above 100° C. until foaming and bubbling cease.

In the examples, soluble naphthenate driers were added to the varnishes after they had been thinned and cooled. However, this is not necessary, but the salts of lead, cobalt and/or manganese may be added directly to the hot varnish melt, or in some cases the drier may be omitted.

I have described the use of reactive unsaturated fatty oils in this invention but the unsaturated acid derived from unsaturated fatty oils may be employed and subsequently esterified, if desired.

The use of a catalyst is indispensable to the present process. As an example, 1 part of resin A is heated with 2 parts of raw tung oil at 120° C. for about 30 hours. Little or no thickening of the mixture takes place in this time and the resin precipitates from the oil upon addition of V. M. & P. naphtha. If, however, 0.1 to 0.06 part of oxalic acid is added and the oil-resin mixture heated to 120° C., thickening takes place in about 5 minutes. On the other hand, if 0.1 to 0.06 part of oxalic acid is heated to 120° C. in 2 parts of raw tung oil for 40 hours, little or no thickening takes place, indicating that the catalyst has little or no polymerizing or gelatinizing effect upon the tung oil at that temperature. The varnish reaction products may be thinned with petroleum solvents, such as V. M. & P. naphtha or hydrosolvents, such as that known to the trade as Solvesso, or other solvents, such as toluol, xylol, turpentine, and the like, or mixtures of these solvents. Mineral spirit soluble driers, such as lead and cobalt naphthenates, resinates, and so forth, may be employed or the driers may be cooked directly into the resin-oil reaction product in the form of salts of lead, cobalt and/or manganese.

The temperatures indicated above for the primary reaction of resin and oil, that is, 90°–160° C., are the preferred temperatures. Temperatures higher than 160° C. and lower than 90° C. may be used but for the most satisfactory results when employing oxalic acid as the catalyst the range from 90° to 160° C. is entirely satisfactory. Temperatures lower than 90° C. necessitate an extremely long heating of the oil-resin mixture in order to bring about reaction when catalytic amounts of oxalic acid are used and temperatures higher than 160° C. are undesirable since oxalic acid sublimes from the reaction mixture at a rapid rate, requiring frequent replenishing of the acid. Temperatures of 110°–140° C. give the smoothest reaction, that is, one which proceeds evenly without rapid gelling or local polymerization which would result in a lumpy composition. With acids other than oxalic acid different temperatures may be used as dictated by the characteristics of the acid. Therefore it is understood that when the temperature range of 90° to 160° C. is indicated I imply the employment of oxalic acid or its equivalent. Other acid catalysts may require a different temperature range. The temperatures used in the present invention for primary reaction of a phenolic resin with a drying oil in the presence of a catalyst are far below those used in ordinary varnish kettle practice. For instance, if temperatures of 90° to 160° C. or even 160° to 200° C. are used in the usual varnish kettle practice of making varnishes, extremely long cooking periods would be required and the resulting varnish would, in general, be poor in water, acid, alkali and weather resistance. If heated at 150°–200° C. for the same period usually used at the usual higher varnish making temperatures, the varnish would be poor in body and mineral spirit solubility, as well as having relatively no resistance to mechanical and chemical agents. Furthermore, when made from tung oil the latter varnishes would have a tendency to dry to a frosted or wrinkled surface. Varnish kettle practice usually demands temperatures of 250° C. and higher.

To recapitulate, the process of the present invention comprises reacting an oil-soluble phenolic resin with a drying oil at a relatively low temperature in the presence of an acid condensing agent to provide siccative compositions capable of yielding substantially alkali, acid, water and weather resistant films.

The varnishes made by the process of this invention are more durable as indicated by alkali resistance than the varnishes made in the usual manner of varnish making, possibly since a better combination of the oil and resin is secured. In the usual varnish kettle practice, thickening of, for example, an oil-soluble phenolic resin mixture to a large degree may be assumed to be due to polymerization of the drying oil itself. In the present process, however, at the temperatures used little or no polymerization of the drying oil itself would be likely to take place but the thickening observed may be attributed to substantially a reaction of the resin with the drying oil. In any event, the products of the present invention are new and distinct from those resulting merely from heating the resin and oil together in the usual manner. This is clearly indicated from the facts that the varnish compositions of the present invention exhibit greatly increased alkali resistance over those made by cooking an oil and resin together at a high temperature. If the final products were the same in both instances the siccative compositions of the present invention would not show this increased alkali resistance.

As used in the claims the term "phenolic resin" has reference to the so-called "100 per cent phenolic resin", i. e., a resin which does not contain rosin, ester gum and other solubilizing natural resins or gums.

What I claim is:

1. A tung oil containing varnish manufactured by cooking tung oil and another drying oil with a normally oil-soluble phenolic-aldehyde resin in the usual varnish kettle practice, except that a small amount of oxalic acid is included in the mixture of oil and resin during the heat bodying operation, the temperatures employed are substantially below 200° C., a final brief heating to a top temperature of about 270° C., being employed as a step in the process to eliminate oxalic acid by volatilization.

2. An oil varnish consisting of a drying oil containing conjugated double bonds, a resin, varnish thinners and driers produced by heating the drying oil with an oil soluble phenolic aldehyde resin at a temperature within the range of from 90° C. to 160° C. in the presence of a small amount of an acid catalyst to body the oil and resinous composition sufficiently for varnish purposes, which composition is soluble in the usual varnish thinners to give a clear varnish, and which varnish is adapted to air dry in a few hours when applied to a surface in the form of a film and which dried film is highly resistant to alkali.

3. An oil varnish consisting of a drying oil containing conjugated double bonds, a resin, varnish thinners and driers produced by heating the drying oil with an oil soluble phenolic aldehyde resin at a temperature within the range of from 90° C. to 160° C. in the presence of oxalic acid to produce a thickened oil and resinous composition which is soluble in the usual varnish thinners to form a clear varnish adapted when applied to a surface in the form of a film to air dry in about 3 to 5 hours, and which film is highly alkali resistant.

4. An oil varnish adapted to air-dry produced by cooking at temperatures substantially below 200° C., a mixture consisting of a drying oil containing conjugated double bonds, a normally oil soluble phenolic aldehyde resin and a small amount of one of the class of acids consisting of dichloracetic acid, oxalic acid, phosphoric acid, hydrochloric acid, p-toluene sulphonic acid, sulphuric acid and monochloracetic acid, until the oil is bodied sufficiently for varnish purposes, and thereafter thinning with varnish solvents and adding driers.

5. A tung oil containing varnish adapted to air-dry in a few hours to a frost-free, non-crow-footed, non-wrinkled film produced by cooking at temperatures within the range of from 90° C. to 160° C., a mixture consisting of tung oil, a normally oil soluble phenolic aldehyde resin and a small amount of one of the class of acids consisting of dichloracetic acid, oxalic acid, phosphorus acid, hydrochloric acid, p-toluene sulphonic acid, sulphuric acid and monochloracetic acid, until the oil is bodied sufficiently for varnish purposes, and thereafter thinning with varnish solvents and adding driers.

6. A tung oil containing varnish adapted to air-dry in a few hours to a frost-free, non-crow-footed, non-wrinkled film produced by cooking at temperatures within the range of from 90° C. to 160° C., a mixture consisting of tung oil, a normally oil soluble phenolic aldehyde resin and a small amount of an acid catalyst until the tung oil is bodied sufficiently for varnish purposes, and thereafter thinning with varnish solvents and adding driers.

7. The tung oil varnish set forth in claim 6, in which the acid catalyst is oxalic acid.

8. An oil varnish adapted to air-dry, produced by cooking at temperatures within the range of from 90° C. to 160° C., a mixture consisting of a drying oil containing conjugated double bonds, a normally oil soluble phenolic resin and a small amount of an acid catalyst until the oil is bodied sufficiently for varnish purposes, and thereafter thinning with varnish solvents and adding driers.

JOHN B. RUST.